United States Patent
Kotha et al.

(10) Patent No.: US 9,338,094 B2
(45) Date of Patent: May 10, 2016

(54) SYSTEM AND METHOD FOR CONTEXT AWARE NETWORK

(71) Applicant: Dell Products, L.P., Round Rock, TX (US)

(72) Inventors: Saikrishna M. Kotha, San Jose, CA (US); Suresh Katukam, Milpitas, CA (US)

(73) Assignee: DELL PRODUCTS, L.P., Round Rock, TX (US)

( * ) Notice: Subject to any disclaimer, the term of this patent is extended or adjusted under 35 U.S.C. 154(b) by 98 days.

(21) Appl. No.: 14/231,612

(22) Filed: Mar. 31, 2014

(65) Prior Publication Data

US 2015/0281073 A1    Oct. 1, 2015

(51) Int. Cl.
*H04L 12/741* (2013.01)
*H04L 12/713* (2013.01)
*H04L 12/721* (2013.01)
*H04L 12/703* (2013.01)
*H04L 12/707* (2013.01)

(52) U.S. Cl.
CPC ............ *H04L 45/745* (2013.01); *H04L 45/586* (2013.01); *H04L 45/22* (2013.01); *H04L 45/28* (2013.01); *H04L 45/38* (2013.01)

(58) Field of Classification Search
None
See application file for complete search history.

(56) References Cited

U.S. PATENT DOCUMENTS

| | | | | |
|---|---|---|---|---|
| 6,097,718 A | * | 8/2000 | Bion | H04L 45/02 370/351 |
| 6,363,072 B1 | * | 3/2002 | Furuichi | H04L 12/4608 370/395.52 |
| 6,505,160 B1 | * | 1/2003 | Levy | G06F 17/30017 455/3.06 |
| 6,807,149 B1 | * | 10/2004 | Alexander, Jr. | H04L 1/22 370/218 |
| 6,826,147 B1 | * | 11/2004 | Nandy | H04L 47/10 370/229 |
| 6,856,676 B1 | * | 2/2005 | Pirot | H04L 29/06027 379/201.01 |
| 6,885,667 B1 | * | 4/2005 | Wilson | H04L 12/56 370/331 |
| 7,590,259 B2 | * | 9/2009 | Levy | G06F 17/30017 382/100 |
| 7,899,916 B1 | * | 3/2011 | Bumstead | H04L 12/5601 709/227 |
| 7,969,898 B1 | * | 6/2011 | Raj | H04L 12/462 370/242 |

(Continued)

*Primary Examiner* — Bunjob Jaroenchonwanit
(74) *Attorney, Agent, or Firm* — Haynes & Boone LLP

(57) ABSTRACT

A system and method for handling context aware network includes a managing server including a control unit, a memory coupled to the control unit, one or more virtual routing and forwarding (VRF) tables stored in the memory, and one or more ports coupled to the control unit and configured to couple the managing server to a network. The managing server is configured to store VRF information in the one or more VRF tables, receive a request packet including a context from a first edge switch, determine the context included in the request packet, examine the one or more VRF tables to identify a VRF-ID associated with the context, and forward a VRF configuration flow control message to the first edge switch. The managing server is further configured to forward one or more additional VRF configuration flow control messages to one or more second edge switches.

33 Claims, 8 Drawing Sheets

(56) References Cited

U.S. PATENT DOCUMENTS

| | | | | |
|---|---|---|---|---|
| 7,986,915 B1* | 7/2011 | Wang | | H04B 7/155 455/7 |
| 8,339,973 B1* | 12/2012 | Pichumani | | H04L 43/10 370/248 |
| 8,660,129 B1* | 3/2014 | Brendel | | H04L 12/4641 370/397 |
| 8,693,344 B1* | 4/2014 | Adams | | H04L 49/65 370/241 |
| 8,693,487 B2* | 4/2014 | Rekhter | | H04L 12/4641 370/409 |
| 9,019,962 B1* | 4/2015 | Ghosh | | H04L 45/586 370/392 |
| 2002/0052754 A1* | 5/2002 | Joyce | | G06Q 20/00 455/407 |
| 2003/0053453 A1* | 3/2003 | Ono | | H04L 12/5695 370/389 |
| 2003/0091049 A1* | 5/2003 | Abe | | H04L 12/24 370/392 |
| 2003/0117954 A1* | 6/2003 | De Neve | | H04L 12/4641 370/230 |
| 2003/0210705 A1* | 11/2003 | Seddigh | | H04L 12/5695 370/419 |
| 2003/0212900 A1* | 11/2003 | Liu | | H04L 63/101 726/13 |
| 2004/0066782 A1* | 4/2004 | Nassar | | H04L 12/2856 370/389 |
| 2004/0083298 A1* | 4/2004 | El Mghazli | | H04L 41/0893 709/230 |
| 2005/0276230 A1* | 12/2005 | Akahane | | H04L 12/2602 370/252 |
| 2006/0045075 A1* | 3/2006 | Jiang | | H04L 12/2859 370/352 |
| 2006/0050702 A1* | 3/2006 | Matsui | | H04L 41/0893 370/392 |
| 2006/0187911 A1* | 8/2006 | Huotari | | H04L 12/4633 370/389 |
| 2006/0224883 A1* | 10/2006 | Khosravi | | H04L 63/20 713/151 |
| 2006/0294211 A1* | 12/2006 | Amato | | H04L 69/40 709/220 |
| 2007/0177622 A1* | 8/2007 | Kim | | H04L 45/00 370/428 |
| 2008/0084876 A1* | 4/2008 | May | | G08B 25/004 370/389 |
| 2008/0240098 A1* | 10/2008 | Uttaro | | H04L 12/66 370/392 |
| 2009/0037607 A1* | 2/2009 | Farinacci | | H04L 12/4641 709/249 |
| 2009/0279557 A1* | 11/2009 | Wang | | H04L 45/02 370/401 |
| 2009/0300611 A1* | 12/2009 | Devine | | G06F 12/1009 718/1 |
| 2009/0323689 A1* | 12/2009 | Saito | | H04L 12/4625 370/390 |
| 2010/0149988 A1* | 6/2010 | Matsubara | | H04L 45/38 370/237 |
| 2011/0032843 A1* | 2/2011 | Papp | | H04L 12/4666 370/254 |
| 2011/0110370 A1* | 5/2011 | Moreno | | H04L 45/64 370/392 |
| 2012/0110049 A1* | 5/2012 | Lines | | G06F 17/30988 708/212 |
| 2012/0224579 A1* | 9/2012 | Ashwood-Smith | . | H04L 12/4625 370/392 |
| 2012/0246206 A1* | 9/2012 | Yamada | | H04L 67/1095 707/827 |
| 2012/0275301 A1* | 11/2012 | Xiong | | H04L 49/357 370/230 |
| 2013/0058345 A1* | 3/2013 | Kano | | H04L 12/4633 370/392 |
| 2013/0077628 A1* | 3/2013 | Appalla | | H04L 45/16 370/390 |
| 2013/0182722 A1* | 7/2013 | Vishveswaraiah | .... | H04L 12/467 370/475 |
| 2013/0322453 A1* | 12/2013 | Allan | | H04L 12/4662 370/395.53 |
| 2014/0068573 A1* | 3/2014 | Brewis | | G06F 11/0772 717/140 |
| 2014/0119367 A1* | 5/2014 | Han | | H04L 12/4633 370/389 |
| 2014/0195666 A1* | 7/2014 | Dumitriu | | H04L 12/4625 709/223 |
| 2014/0244851 A1* | 8/2014 | Lee | | H04L 45/00 709/228 |
| 2014/0269274 A1* | 9/2014 | Banavalikar | | H04L 49/10 370/230 |
| 2014/0337500 A1* | 11/2014 | Lee | | H04L 41/12 709/223 |
| 2014/0341226 A1* | 11/2014 | Okita | | H04L 43/0817 370/401 |
| 2015/0067787 A1* | 3/2015 | Stanasolovich | | H04L 63/10 726/4 |
| 2015/0207736 A1* | 7/2015 | Roch | | H04L 45/50 370/393 |

* cited by examiner

212 →

| VRF-ID | Context Association |
|--------|---------------------|
| VRF-#1 | A232-D230-S220, A282-D280-S270 |
| VRF-#2 | D236-S220, D266-S250, D286-S270 |
| VRF-#3 | D238-S220, D268-S250 |

| VRF-ID | Flow-ID | Switch Association |
|--------|---------|--------------------|
| VRF-#1 | Flow-1  | S220, S270 |
| VRF-#2 | Flow-2  | S220, S250, S270 |
| VRF-#3 | Flow-3  | S220, S250 |

*FIG. 3B*

| Flow-ID | Device Association | VRF-ID |
|---|---|---|
| Flow-1 | D230-A232 | VRF-#1 |
| Flow-2 | D236 | VRF-#2 |
| Flow-3 | D238 | VRF-#3 |

FIG. 3C

| Flow-ID | Device Association | VRF-ID |
|---|---|---|
| Flow-2 | D266 | VRF-#2 |
| Flow-3 | D268 | VRF-#3 |

FIG. 3D

| Flow-ID | Device Association | VRF-ID |
|---|---|---|
| Flow-1 | D280-A282 | VRF-#1 |
| Flow-2 | D286 | VRF-#2 |

FIG. 3E

SYSTEM AND METHOD FOR CONTEXT AWARE NETWORK

BACKGROUND

The present disclosure relates generally to information handling systems, and more particularly to recognition and handling of context related network.

As the value and use of information continues to increase, individuals and businesses seek additional ways to process and store information. One option is an information handling system (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

Additionally, some embodiments of information handling systems include non-transient, tangible machine-readable media that include executable code that when run by one or more processors, may cause the one or more processors to perform the steps of methods described herein. Some common forms of machine readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Computer networks form the interconnection fabric that enables reliable and rapid communications between computer systems and data processors that are in both close proximity to each other and at distant locations. These networks create a vast spider web of intranets and internets for handling all types of communication and information. Making all of this possible is a vast array of network switching products that make forwarding decisions in order to deliver packets of information from a source system or first network switch to a destination system or second network switch. Due to the size, complexity, and dynamic nature of these networks, sophisticated network switching products are often required to continuously make routing and/or forwarding decisions and to update routing and/or forwarding information as network configurations change. In many cases, some level of traffic isolation is needed to separate one class of traffic from another class of traffic for various reasons such as regulations and/or security concerns. Many network systems utilize technologies such as virtual routing and forwarding (VRF)-lite to create separated forwarding strategies. However, these technologies are often difficult and laborious to configure, deploy, and/or manage.

Accordingly, it would be desirable to provide improved systems and methods for context aware network using a software defined network (SDN).

SUMMARY

According to one embodiment, a managing server includes a control unit, a memory coupled to the control unit, one or more virtual routing and forwarding (VRF) tables stored in the memory, and one or more ports coupled to the control unit and configured to couple the managing server to a network. The managing server is configured to store VRF information in the one or more VRF tables, receive a request packet including a context from a first edge switch, determine the context included in the request packet, examine the one or more VRF tables to identify a VRF-ID associated with the context, and forward a VRF configuration flow control message to the first edge switch. The VRF configuration flow control message includes one or more instructions for handling the context.

According to another embodiment, a method of managing networks includes storing VRF information in one or more VRF tables, receiving a request packet including a context from a first edge switch, determining the context included in the request packet, examining the one or more VRF tables to identify a VRF-ID associated with the context, and forwarding a VRF configuration flow control message to the first edges witch, the VRF configuration flow control message including one or more instructions for handling the context.

According to yet another embodiment, an edge switch includes a control unit, a memory coupled to the control unit, one or more flow tables stored in the memory, and one or more ports coupled to the control unit and configured to couple the edge switch to a network. The edge switch is configured to receive a first packet including a first context, forward a request packet including the first context to a managing server, receive a first VRF configuration flow control message from the managing server, update the one or more flow tables based on the first VRF configuration flow control message, and forward the first packet based on the updated one or more flow tables.

According to yet another embodiment, a method of handling network packets includes receiving a first packet including a first context at an edge switch, forwarding a request packet including the first context to a managing server, receiving a first VRF configuration flow control message from the managing server, updating one or more flow tables based on the first VRF configuration flow control message, and forwarding the first packet based on the updated one or more flow tables.

According to yet another embodiment, an information handling system includes a managing server and a first edge switch. The managing server includes a first processor, a first memory coupled to the first processor, and one or more virtual routing and forwarding (VRF) tables stored in the first memory. The first edge switch includes a second processor, a second memory coupled to the second processor, and one or more flow tables stored in the second memory. The managing server is configured to store VRF information in the one or more VRF tables, receive a request packet including a first context from the first edge switch, determine the first context included in the request packet, examine the one or more VRF tables to identify a VRF-ID associated with the first context, and forward a VRF configuration flow control message to the first edge switch. The VRF configuration flow control message includes one or more instructions for handling the first context. The first edge switch is configured to receive a first packet associated with the first context, forward the request packet to the managing server, receive the VRF configuration flow control message from the managing server, update the one or more flow tables based on the VRF configuration flow control message, and forward the first packet based on the updated one or more flow tables.

BRIEF DESCRIPTION OF THE DRAWINGS

FIG. 3A-3B are simplified diagrams of virtual routing and forwarding (VRF) tables stored in the SDN managing server of FIG. 2 according to some embodiments.

FIG. 3C-3E are simplified diagrams illustrating VRF configuration flow associations to be associated with VRF-ID associated flow control messages according to some embodiments.

In the figures, elements having the same designations have the same or similar functions.

DETAILED DESCRIPTION

In the following description, specific details are set forth describing some embodiments consistent with the present disclosure. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or whether the one or more features would make an embodiment non-functional.

For purposes of this disclosure, an IHS may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an IHS may be a personal computer, a Personal Digital Assistant (PDA), a consumer electronic device, a display device or monitor, a network server or storage device, a switch router or other network communication device, or any other suitable device and may vary in size, shape, performance, functionality, and price. The IHS may include memory, one or more processing resources such as a central processing unit (CPU) or hardware or software control logic. Additional components of the IHS may include one or more storage devices, one or more communications ports for communicating with external devices as well as various input and output (I/O) devices, such as a keyboard, a mouse, and a video display. The IHS may also include one or more buses operable to transmit communications between the various hardware components.

Figure 1:
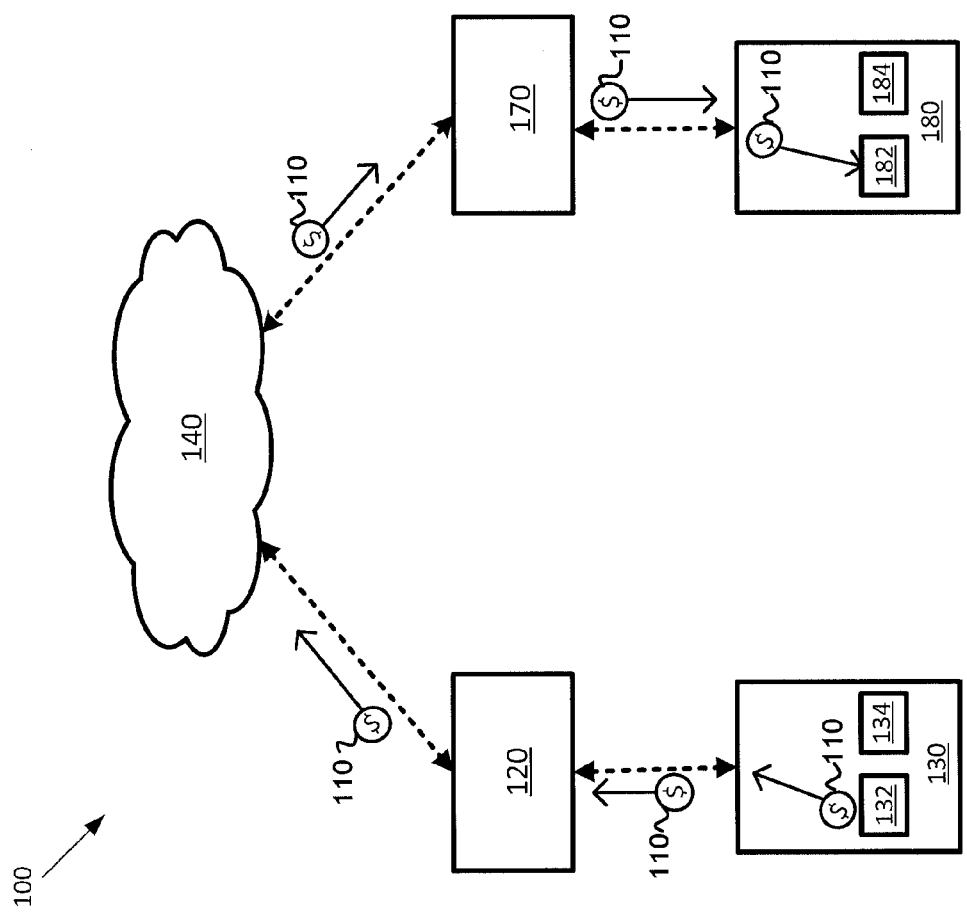
FIG. 1 is a simplified diagram showing the flow of the data packets using a network system according to some embodiments.

FIG. 1 is a simplified diagram showing the flow of the data packets (e.g., a packet 110) using a network 100 according to some embodiments. Network 100 may include a network switching device 120 coupled to a sub-network 140. An end device 130 may be coupled to network switching device 120, therefore network switching device is referred to as an edge switch 120 in the following disclosure. End device 130 may include an application 132. In some embodiments, application 132 is a payment card industry (PCI)-related application which can transmit and receive PCI-related network traffic. Network 100 may also include a network switching device or an edge switch 170. An end device 180 may be coupled to edge switch 170, and end device 180 may include an application 182. In some embodiments, application 182 is PCI-related and capable of transmitting and receiving PCI-related network traffic. In some embodiments, edge switch 120 and/or edge switch 170 may be a switch, a router, a bridge, a hub, and/or the like. In some embodiments, end device 130 and/or end device 180 may be a server, a work station, a PC, a laptop, a tablet, a mobile device, and/or the like. In some embodiments, each of edge switch 120 and edge switch 170 may include one or more processors and a memory. Additional routers, switches, devices, and/or network links may be included in the sub-network 140. In some embodiments, sub-network 140 may include one or more virtual sub-networks or slices used to carry different kinds of network traffic. In some embodiments, one or more protocols may be used to create the virtual sub-networks or network slices in the sub-network 140.

Still referring to FIG. 1, in some embodiments, edge switch 120, edge switch 170, and routers/switches in sub-network 140 may be configured to use virtual routing and forwarding (VRF) to send, transmit, and receive traffic networks. VRF is an IP-based virtual separation of networks to support more than one virtual private network (VPN). VRF uses input interfaces to separate routes for different VPNs and forms VRF tables by associating one or more IP interfaces with each VRF. Multiple versions of VRF tables may be used to forward different network traffic using different strategies respectively. VRF may be applied by adding a VRF header to a network packet to form a VRF packet. In order to forward the packets with the VRF header, edge switch 120, edge switch 170, and routers/switches in sub-network 140 may be configured to handle the VRF packets.

An exemplary embodiment of handling a PCI-related packet 110 using network 100 may be discussed using FIG. 1. In some embodiments, a PCI-related packet 110 may be generated by PCI-related application 132 of end device 130 to be delivered to PCI-related application 182 of end device 180. PCI-related packet 110 may include various network headers such as TCP and IP headers including a source IP address, a destination IP address, a protocol ID, a source port, a destination port, and/or the like. PCI-related packet 110 may also include a VRF header. PCI-related packet 110 may be transmitted from end device 130 to edge switch 120.

When edge switch 120 receives PCI-related packet 110, edge switch 120 may look up the VRF tables and/or other forwarding tables to find the VRF related information associated with routing/forwarding the PCI-related packet 110. In order to handle the PCI-related packet 110 properly, edge switch 120 may be configured to be a VRF switch to include related information for handling PCI-related packet 110 in the VRF tables and/or other forwarding tables. The edge switch 120 may be manually provisioned by an administrator with the VRF related information associated with handling PCI-related packets. In some examples, when there are other types of packets being transmitted using edge switch 120 in network 100, the VRF tables and/or other forwarding tables may also be manually provisioned by an administrator with the VRF related information associated with handling the corresponding types of packets. When a route for forwarding PCI-related packet 110 is found, edge switch 120 may forward PCI-related packet 110 to one or more network slices in sub-network 140 towards edge switch 170.

In order to handle the PCI-related packet 100 properly, the one or more network slices in sub-network 140 may also be provisioned by an administrator to include VRF related information associated with handling PCI-related packets. PCI-related packet 110 may then be forwarded to edge switch 170.

When edge switch 170 receives PCI-related packet 110, it may look up the VRF tables and/or other forwarding tables to find the VRF related information associated with handling the PCI-related packet 110. Similar to edge switch 120, edge switch 170 may be manually provisioned by an administrator with the VRF related information associated with handling PCI-related packets. When there are other types of packets being transmitted using edge switch 170 in network 100, the VRF tables and/or other forwarding tables of edge switch 170 may also be manually provisioned by an administrator to include the VRF related information associated with handling the corresponding types of packets. When a route for forwarding PCI-related packet 110 is found, edge switch 170 may forward PCI-related packet 110 to end device 180 for handling. End device 180 may use application 182 to handle the PCI-related packet 110.

As discussed with reference to FIG. 1, the use of the VRF in network 100 may have some disadvantages. For example, maintenance of network 100 may have a high cost and/or become a complex process, because the routing/forwarding information in each switch in network 100 includes hop-by-hop configuration for each of the VRF slices, which are manually provisioned by a network administrator. Each switch in network 100 is also manually configured with updated information every time there is a change to network 100 and/or any of the network slices in network 100. This can be a laborious process which is prone to errors. In addition, each switch in network 100 is VRF-aware, so this makes it difficult to extend the current network to include non-VRF switches. Moreover, the ability of the switches in network 100 to evaluate the context of the packets may be limited.

Figure 2:
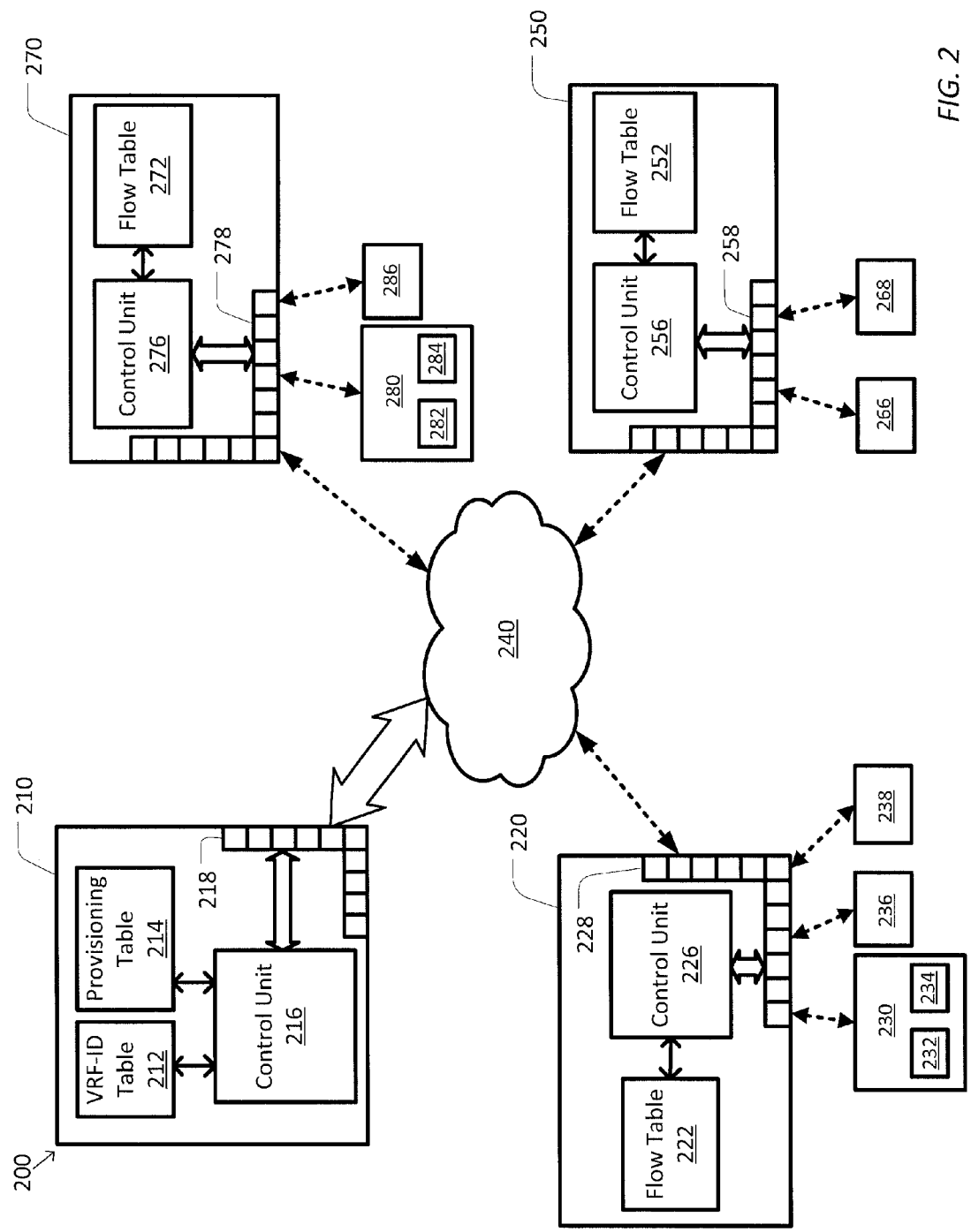
FIG. 2 is a simplified diagram of a network system including a software defined network (SDN) managing server according to some embodiments.

FIG. 2 is a simplified diagram of a network 200 including a software defined network (SDN) managing server 210 according to some embodiments. Referring to FIG. 2, SDN managing server 210 is operating as a master controller and/or a managing controller for the network 200. SDN managing server 210 includes one or more VRF tables, e.g., a VRF-ID table 212 and a provisioning table 214, and a control unit 216 coupled to the one or more VRF tables. In some examples, control unit 216 may manage and/or control the operation of the SDN managing server 210. In some examples, control unit 216 may include one or more processors. In some embodiments, SDN managing server 210 may also include one or more ports 218 for coupling SDN managing server 210 to a sub-network (e.g., sub-network 240) and/or other network switching devices for transmitting and receiving flow control messages, e.g., VRF configuration flow control messages. In some examples, SDN managing server 210 may also include one or more management tables (not shown). The management tables may be used by SDN managing server 210 and/or control unit 216 to store information regarding the configuration of other devices in the network 200. In some examples, the management tables may include provisioning information for the other devices. In some examples, the management tables may be stored in memory coupled with the SDN managing server 210 and/or the control unit 216. In some examples, the management tables may be implemented using data structures other than tables and/or using databases.

The one or more VRF tables e.g., VRF table 212 and provisioning table 214, may be used by SDN managing server 210 and/or control unit 216 to store VRF associated flow information regarding the configuration of other switches, devices and/or applications in the network 200. In some examples, the VRF tables, e.g., VRF tables 212 and provisioning table 214, may be stored in memory coupled with SDN managing controller 210 and/or the control unit 216. In some examples, the VRF tables may also include provisioning information to be dynamically propagated into the edge switches, e.g., edge switches 220, 250, 270, and/or other switches in subnetwork 240. In some examples, VRF may be used to create one or more virtual networks using the physical sub-networks, so that different types of network traffic, each encapsulated using VRF headers including a respective VRF-ID and/or Flow-ID, may be handled using different data flow paths. In some examples, SDN managing server 210 may transmit provisioning and/or flow control messages to edge switches, e.g., edge switches 220, 250, 270 and/or other switches in subnetwork 240, to create or update the multiple versions of the forwarding tables in the edge switches to support VRF in the edge switches. In some examples, the VRF tables may also be implemented using data structures other than tables and/or using databases. In some examples, some or all of the provisioning and/or flow control messages may be transmitted and/or received using the one or more ports 218.

In some embodiments, the network 200 may further include additional network switching devices and/or network devices coupled to SDN managing server 210 using network links. In some embodiments as shown in FIG. 2, these additional network switching devices, network devices, and/or network links are included in a physical sub-network 240. In some examples, sub-network 240 may also be used to couple SDN managing server 210 to the additional switches and/or devices. In some examples, sub-network 240 may include one or more virtual sub-networks or slices used to carry different kinds of network traffic. In some embodiments, one or more protocols may be used to create the virtual sub-networks or network slices in the sub-network 240. In some embodiments, sub-network 240 may include one or more switches and/or devices that may or may not be VRF aware. In some embodiments, sub-network 240 may also include one or more switches and/or devices that may or may not be context aware. In some examples, each of the switches in the sub-network 240 that is not an edge switch may not receive VRF configuration information, e.g., VRF configuration flow control messages, from the SDN managing server. In some examples, each of the switches in the sub-network 240 that is not an edge switch may not be provisioned by the SDN managing server with VRF configuration information.

In some examples, the sub-network 240 includes one or more slices that may support separate forwarding and/or processing paths for the different types of network traffic. In some examples, one or more types of network traffic transmitted and forwarded may be payment-related traffic, e.g., PCI-related traffic, and the PCI-related traffic may be transmitted and forwarded using a path different from the path used to transmit the non PCI-related traffic. In some examples, one or more types of network traffic transmitted and forwarded may be department-related traffic. For example in a university, the path(s) used to transmit and forward the network traffic among faculties may be separate from the path(s) used to transmit and forward the network traffic among students. Also for example in a company, human resource (HR)-related data may include private information such as employee's salary, medical information, and/ or other personal information. Therefore, the path(s) used to transmit and forward the HR-related network traffic may be separate from the path(s) used to transmit and forward the network traffic of the other departments. In some examples, one or more types of network traffic may also be encrypted. In some examples, the network slices may be dynamically reconfigured by the SDN managing server 210 based on changing conditions in the network 200.

Referring to FIG. 2, network 200 further includes an edge switch 220. In some embodiments, edge switch 220 includes one or more ports 228 for coupling edge switch 220 to sub-network 240 for transmitting and receiving network traffic. In some examples, the one or more ports 228 can also be used for coupling edge switch 220 to other network switching devices and/or end devices, e.g., end devices 230, 236, and 238. In some embodiments, edge switch 220 also includes one or more flow tables (e.g., flow table 222) and a control unit 226 configured to manage and/or control the operation of edge switch 220. In some examples, control unit 226 may include one or more processors. In some examples, the one or more flow tables (e.g., flow table 222) may be implemented using data structures other than tables and/or using databases. In some embodiments as shown in FIG. 2, edge switch 220 is operating as a slave switch and/or a non-managing switch for the network 200. In some examples, the control unit 226 may maintain and/or update the one or more flow tables (e.g., flow table 222) of edge switch 220. In some examples, the control unit 226 of edge switch 220 may receive VRF configuration flow control messages from SDN managing server 210 to update the information stored in the one or more flow tables (e.g., flow table 222).

Edge switch 220 may also include one or more other tables (not shown) including forwarding and/or routing information used for forwarding network traffic. In some examples, the one or more other tables may include virtual LAN (VLAN) tables, media access control (MAC) tables, layer 3 (L3) tables, L3 forwarding information bases (FIBs), access control lists (ACLs), flow processing (FP) tables, hash tables, and/or the like. In some examples, the one or more other tables may be stored in memory coupled with edge switch 220 and/or the control unit 226. In some examples, the one or more other tables may be implemented using data structures other than tables and/or using databases.

Still referring to FIG. 2, edge switch 220 is further coupled to one or more end devices, for example, end devices 230, 236 and 238. End devices 230, 236 and 238 are coupled to one or more ports 228 of edge switch 220. In some examples, each of the end devices 230, 236 and 238 may be an electronic device, e.g., a computer or a mobile device. In some examples as shown in FIG. 2, end device 230 includes one or more applications, e.g., an application 232 and an application 234. In some examples, application 232 is a PCI-related application which can transmit and receive PCI-related data. In some examples, application 234 of end device 230, and end devices 236 and 238 are non-PCI related. In some examples, end device 238 is HR-related which can transmit and receive HR-related data.

Referring to FIG. 2, network 200 further includes edge switch 250. In some embodiments, edge switch 250 includes one or more ports 258 for coupling edge switch 250 to sub-network 240 for transmitting and receiving network traffic. In some examples, the one or more ports 258 can also be used for coupling edge switch 250 to other network switching devices and/or end devices, e.g., end devices 266 and 268. In some embodiments, edge switch 250 also includes one or more flow tables (e.g., flow table 252) and a control unit 256 configured to manage and/or control the operation of edge switch 250. In some examples, control unit 256 may include one or more processors. In some examples, the one or more flow tables (e.g., flow table 252) may be implemented using data structures other than tables and/or using databases. In some embodiments as shown in FIG. 2, edge switch 250 is operating as a slave switch and/or a non-managing switch for the network 200. In some examples, the control unit 256 may maintain and/or update the one or more flow tables (e.g., flow table 252) of edge switch 250. In some examples, the control unit 256 of edge switch 250 may receive VRF configuration flow control message from SDN managing server 210 to update the information stored in the one or more flow tables.

Edge switch 250 may also include one or more other tables (not shown) including forwarding and/or routing information used for forwarding network traffic. In some examples, the routing tables may include VLAN tables, MAC tables, L3 tables, L3 FIBs, ACLs, FP tables, hash tables and/or the like. In some examples, the one or more other tables may be stored in memory coupled with edge switch 250 and/or the control unit 256. In some examples, the one or more other tables may be implemented using data structures other than tables and/or using databases.

Still referring to FIG. 2, edge switch 250 is further coupled to one or more end devices, for example, end devices 266 and 268 using one or more ports 258 of edge switch 250. In some examples, each of end devices 266 and 268 includes an electronic device, e.g., a computer or a mobile device. In some examples end devices 266 and 268 are non-PCI related devices which are similar to end devices 236 and 238 coupled to edge switch 220. In some examples, end device 268 is HR-related which can transmit and receive HR-related data.

Referring to FIG. 2, network 200 further includes edge switch 270. Edge switch 270 may include one or more ports 278 for coupling edge switch 270 to sub-network 240 for transmitting and receiving network traffic. In some examples, the one or more ports 278 can also be used for coupling edge switch 270 to other network switching devices and/or end devices, e.g., end devices 280 and 286. Edge switch 270 may also include one or more flow tables (e.g., flow table 272) and a control unit 276 configured to manage and/or control the operation of edge switch 270. In some examples, control unit 276 may include one or more processors. In some examples, the one or more flow tables (e.g., flow table 272) may be implemented using data structures other than tables and/or using databases. As shown in FIG. 2, edge switch 270 may be operating as a slave switch and/or a non-managing switch for the network 200. In some examples, the control unit 276 may maintain and/or update the one or more flow tables (e.g., flow table 272) of edge switch 270. In some examples, the control unit 276 of edge switch 270 may receive VRF configuration flow control message from SDN managing server 210 to update the information stored in the one or more flow tables.

Edge switch 270 may also include one or more other tables (not shown) including forwarding and/or routing information used for forwarding network traffic. In some examples, the routing tables may include VLAN tables, MAC tables, L3 tables, L3 FIBs, ACLs, FP tables, hash tables and/or the like. In some examples, the one or more other tables may be stored in memory coupled with edge switch 270 and/or the control unit 276. In some examples, the one or more other tables may be implemented using data structures other than tables and/or using databases.

Still referring to FIG. 2, edge switch 270 is further coupled to one or more end devices, for examples, end devices 280 and 286 using one or more ports 278 of edge switch 270. In some examples, each of end devices 280 and 286 includes an electronic device, e.g., a computer or a mobile device. In some examples, end device 280 includes one or more applications, e.g., an application 282 and an application 284. In some examples, application 282 is a PCI-related application which can transmit and receive PCI-related data. Application 284 of end device 280 and end device 286 are non-PCI related.

In some embodiments, edge switch 220, edge switch 250, and/or edge switch 270 may be a switch, a router, a bridge, a hub, and/or the like. In some examples, end device 230, end device 236, end device 238, end device 266, end device 268, end device 280, and/or end device 286 may be a server, a work station, a PC, a laptop, a tablet, a mobile device, and/or the like. In some examples, the one or more processors included in the control unit(s) of SDN managing server 210, edge switch 220, edge switch 250, and/or edge switch 270 may be any type of central processing unit, microprocessor, microcontroller, multi-core processor, field programmable gate array (FPGA), application specific integrated circuit (ASIC), and/or the like. In some examples, the one or more processors may be a virtual processor of a virtual machine and/or a virtual environment.

FIG. 3A is a simplified diagram of a VRF-ID table 212 that can be used in the SDN managing server 210 of FIG. 2 according to some embodiments. In some examples, the VRF-ID table 212 lists different VRF flows separated based on context of the data packets exchanged between the related devices and/or applications. Each VRF flow used to transmit data packets with a certain context is associated with a VRF-ID. For example, PCI-related data packets associated with the flow between application 232 at end device 230 and application 282 at end device 280 used to transmit the PCI-related data packets are assigned a VRF-ID of VRF-#1. End devices 236, 266 and 286 may be used to exchange data packets based on a similar context, thus the data packets associated with the flow among end device 236 at edge switch 220, end device 266 at edge switch 250, and end device 286 at edge switch 270 are assigned a VRF-ID of VRF-#2. End devices 238 and 268 may be used to exchange HR-related network traffic, thus the HR-related data packets associated with the flow between end device 238 at edge switch 220 and end device 268 at edge switch 250 are assigned a VRF-ID of VRF-#3.

FIG. 3B is a simplified diagram of a provisioning table 214 that can be used in the SDN managing server 210 of FIG. 2 according to some embodiments. In some examples, provisioning table 214 is used by the SDN managing server 210 to identify the edge switches associated with each flow. In some examples, provisioning table 214 may include VRF-IDs of the VRF flows, Flow-IDs assigned to VRF flows for handling the context based traffic flow, and the edge switches that are associated with the respective VRF-ID to handle the corresponding context based traffic flow associated with each respective Flow-ID. In some embodiments, a Flow-ID may be equivalent to and consistent with a VRF-ID.

Still referring to FIG. 3B, in some examples, because application 232 of end device 230 and application 282 of end device 280 are used to transmit and receive PCI-related data, edge switch 220 and edge switch 270 are associated with VRF-#1 and are to be provisioned to exchange PCI-related data packets associated with Flow-1. In some example, end device 236, end device 266, and end device 286 are used to exchange data based on the same context, thus edge switch 220, edge switch 250, and edge switch 270 are associated with VRF-#2 and are to be provisioned to exchange the same context data packets associated with Flow-2. In some examples, end device 238 and end device 268 are used to exchange HR-related data, thus edge switch 220 and edge switch 250 are associated with VRF-#3 and are to be provisioned to exchange HR-related data packets associated with Flow-3.

It is to be understood that the PCI-related flow and HR-related flow are merely examples for the illustration of the present disclosure and they are not intended to be limiting. The context based traffic flow being exchanged among certain edge switches may be associated with a respective VRF-ID. In some examples, the context based traffic flow may be partitioned using user credentials (e.g., user account and password). In some examples, the context based traffic flow may be partitioned using specific time(s) and/or day(s) when the data is being exchanged. In some examples, the context based traffic flow may be partitioned by other departments, such as faculties, students, etc.

FIGS. 3C-3E are simplified diagrams illustrating VRF configuration flow associations/flow associations 312-316, 322-324, and 332-334 that may be used to generate one or more VRF configuration flow control messages that may be transmitted from SDN managing server 210 to the corresponding edge switches 220, 250, and/or 270 to provision the corresponding edge switches respectively. For example, flow association 312 indicates that network traffic with a context to be handled by application 232 of end device 230, e.g., PCI-related network traffic, is associated with Flow-1 and VRF-#1. SDN managing server 210 may use flow association 312 to generate one or more flow control messages to be transmitted to edge switch 220 to provision edge switch 220, so that edge switch 220 may be able to identify the Flow-ID associated with network traffic of the corresponding context, e.g., Flow-1 associated to PCI-related network traffic. Further details of FIGS. 3C-3E will be discussed with respect to FIG. 4 of the present disclosure.

Figure 4:
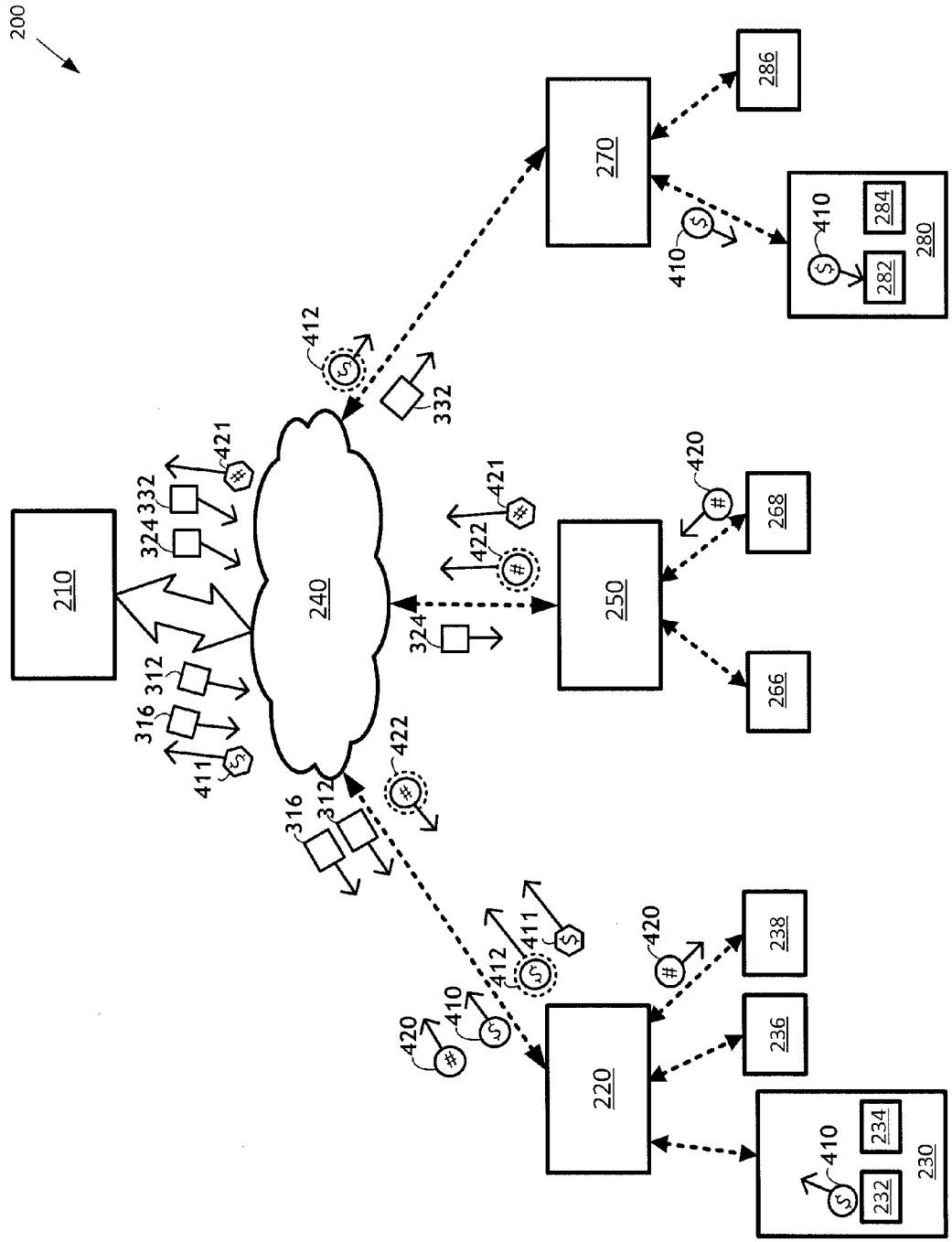
FIG. 4 is a simplified diagram showing flow of example network traffic using the network of FIG. 2 according to some embodiments.

FIG. 4 is a simplified diagram showing flow of example network traffic using network 200 of FIG. 2 according to some embodiments. In some embodiments, a PCI-related packet 410 is generated by application 232 of end device 230 to be received by application 282 of end device 280. In some embodiments, PCI-related packet 410 may include various network headers such as TCP and IP headers including a source IP address, a destination IP address, a protocol ID, a source port, a destination port, and/or the like. In some embodiments, the context of PCI-related packet 410 may be determined from the headers including PCI-related contents stored in the payloads. In some embodiments, PCI-related packet 410 may be transmitted from end device 230 to edge switch 220.

When edge switch 220 receives PCI-related packet 410, it may be passed to control unit 226 for processing. In some examples, when control unit 226 receives PCI-related packet 410, it may determine whether edge switch 220 has provisioning information associated with a flow having a corresponding context to handle the PCI-related packet 410. The control unit 226 may compare the context information of the packet with the information stored in the one or more flow tables 222 of edge switch 220. In some examples, the control unit 226 may determine whether edge switch 220 has the VRF related information that can be used to route/forward PCI-related packet 410 to the destination switch/device. In some examples, when control unit 226 realizes edge switch 220 does not have corresponding VRF related information, control unit 226 may then forward a request packet 411 including at least the PCI-related context of PCI-related packet 410 to SDN managing server 210. In some examples, the request packet 411 may or may not include other information of the PCI-related packet 410, such as layer 2, layer 3 headers, and/or the like. In some examples, control unit 226 may directly forward PCI-related packet 410 to SDN managing server 210 as part of the request packet 411. In some examples, the request packet 411 may be transmitted via the sub-network 240 to SDN managing server 210 as shown in FIG. 4. In some embodiments, the request packet 411 may be transmitted via one of the network slices, such as a control and/or management network slice of the sub-network 240.

When SDN managing server 210 receives request packet 411, it may be passed to control unit 216 for processing. When control unit 216 receives request packet 411, it may examine the context stored in request packet 411. In some examples, the PCI-related context of the request packet 411 may be examined using a deep packet inspection. During deep packet inspection, headers and/or data in one or more of the layers 4-7 may also be inspected to determine the context of the PCI-related packet 410 as included in request packet 411. Control unit 216 may then determine whether SDN managing server 210 has provisioning information for the VRF information associated with the context of the request packet 411 by comparing the packet context information with the VRF tables, e.g., VRF-ID table 212. In some examples, when control unit 216 recognizes VRF-ID table 212 includes the VRF information for the PCI-related context included in request packet 411, control unit 216 may further associate a VRF-ID, e.g., VRF-#1, with PCI-related packet 410.

Control unit 216 may then examine provisioning table 214 as shown in FIG. 3B to find the related edge switches that are to be provisioned with the VRF flow information so that the related edge switches may handle PCI-related packet 410. Control unit 216 may recognize from provisioning table 214 that edge switch 220 and edge switch 270 are to be provisioned with the VRF configuration flow control messages. In some examples, The VRF configuration flow control message based on flow association 312 of FIG. 3C may then be forwarded to edge switch 220 via the sub-network 240, and the VRF configuration flow control message based on flow association 332 of FIG. 3E may be forwarded to edge switch 270 via the sub-network 240. The VRF configuration flow control messages may include instructions for handling the context of the packet. In some embodiments, the VRF configuration flow control messages may be forwarded using one of the network slices, e.g., the management slice, of the sub-network 240.

When edge switch 220 receives the VRF configuration flow control message based on the flow association 312, it may be passed to control unit 226 for processing. Control unit 226 may insert the VRF configuration flow control message into the flow table 222 so that edge switch 220 becomes aware of the VRF information associated with PCI-related packets, e.g., VRF-ID, Flow-ID, and context, that may be used to route/forward the PCI-related packet 410. When edge switch 270 receives the VRF configuration flow control message based on the flow association 332, it may be passed to control unit 276 for processing. Control unit 276 may insert the VRF configuration flow control message into the flow table 272 so that edge switch 270 becomes aware of the VRF information associated with PCI-related packets with the same context.

Control unit 226 of edge switch 220 may encapsulate PCI-related packet 410 with a VRF header corresponding to VRF-#1 to form an encapsulated PCI-related packet 412. In some embodiments, control unit 226 may then create a VRF tunnel for forwarding encapsulated PCI-related packet 412 to edge switch 270. In some examples, the VRF tunnel may meet the PCI requirement that only the related edge switches 220 and 270 may decapsulate the PCI-related packet 410 encapsulated in packet 412. Other switches and/or devices in sub-network 240 may be used to forward the encapsulated PCI-related packet 412 as a regular IP packet based on the information such as source IP address and destination IP address of the packet, without having access to or being aware of the VRF information associated with PCI-related packet 410. In some examples, the PCI-related packet 412 may also be encrypted for security purposes.

Control unit 226 then transmits the encapsulated PCI-related packet 412 towards edge switch 270 via sub-network 240. In some embodiments, the encapsulated PCI-related packet 412 may be transmitted by one or more network slices of the sub-network 240 as a regular IP packet using the information such as source IP address and destination IP address.

When edge switch 270 receives the encapsulated PCI-related packet 412, it may be passed to control unit 276 for processing. In some embodiments, because the edge switch 270 has been provisioned with the VRF configuration flow control message based on flow association 332, and also because the edge witch 270 has been informed by the VRF tunnel created by edge switch 220, control unit 276 of edge switch 270 may recognize the context of encapsulated PCI-related packet 412. Control unit 276 may decapsulate the VRF related header to return the encapsulated PCI-related packet 412 back to the original PCI-related packet 410. In some examples, control unit 276 may also decrypt the PCI-related packet 412 when it has been encrypted by edge switch 220. In some embodiments, control unit 276 may further forward the PCI-related packet 410 to end device 280 for handling. In some embodiments, the end device 280 may use application 288 to handle the PCI-related packet 410.

Another exemplary embodiment related to flow of a department-related packet, e.g., a HR-related packet 420 using network 200 is further illustrated using FIG. 4. In some embodiments, HR-related packet 420 is generated by end device 268 at edge switch 250 to be received by end device 238 at edge switch 220. In some embodiments, HR-related packet 420 may include various network headers such as TCP and IP headers including a source IP address, a destination IP address, a protocol ID, a source port, a destination port, and/or the like. In some embodiments, HR-related packet 420 includes HR-related context. In some embodiments, HR-related packet 420 may be transmitted from end device 268 to edge switch 250.

When edge switch 250 receives HR-related packet 420, it may be passed to control unit 256 for processing. When control unit 256 receives HR-related packet 420, it may examine the information stored in the HR-related packet 420, and determine whether edge switch 250 has provisioning information associated with a flow having a corresponding context to handle the HR-related packet 420. Control unit 256 may compare the context information of the packet with the information stored in the one or more flow tables 252 of edge switch 250. In some examples, when control unit 256 realizes edge switch 250 does not have corresponding VRF information, control unit 256 may then forward a request packet 421 including at least the HR-related context of the HR-related packet 420 to SDN managing server 210. In some examples, the request packet 421 may or may not include other information of the HR-related packet 420, such as layer 2 and/or layer 3 headers, and/or the like. In some examples, control unit 256 may forward HR-related packet 420 to SDN managing server 210 as part of request packet 421. In some examples, request packet 421 may be transmitted via the sub-network 240 to SDN managing server 210 as shown in FIG. 4. In some embodiments, request packet 421 may be transmitted via one of the network slices of the subnetwork 240, such as a control and/or management network slice.

When SDN managing server 210 receives request packet 421, it may be passed to control unit 216 for processing. When control unit 216 receives request packet 421, it may examine the context stored in request packet 421. In some examples, the context of the request packet 421 may be examined using deep packet inspection. Control unit 216 may then determine whether SDN managing server 210 has provisioning information for the VRF information associated with the context included in request packet 421 by comparing the packet context information with the VRF tables, e.g., VRF-ID table 212 of FIG. 3A. When control unit 216 recognizes VRF-ID table 212 includes the VRF information for the HR-related context, control unit 216 may further associate a VRF-ID, e.g., VRF-#3, with HR-related packet 420.

Control unit 216 may then examine provisioning table 214 as shown in FIG. 3B to find the related edge switches that are to be provisioned with the VRF flow information so that related edge switches may handle HR-related packet 420. Control unit 216 may recognize from provisioning table 214 that edge switch 220 and edge switch 250 are to be provisioned with the VRF configuration flow control messages. The VRF configuration flow control message based on flow association 316 of FIG. 3C may then be forwarded to edge switch 220 via the sub-network 240, and the VRF configuration flow control message based on flow association 324 of FIG. 3D may then be forwarded to edge switch 250 via the sub-network 240. In some embodiments, the VRF configuration flow control messages may be forwarded using one or more network slices of the sub-network 240, e.g., the management slice.

When edge switch 250 receives the VRF configuration flow control message based on flow association 324, it may be passed to control unit 256 for processing. Control unit 256 may insert the VRF configuration flow control message based on flow association 324 into the flow table 252 so that edge switch 250 becomes aware of the VRF information associated with HR-related packets, e.g., VRF-ID, Flow-ID, and associated devices, that can be used to route/forward the HR-related packet 420. When edge switch 220 receives the VRF configuration flow control message based on flow association 316, it may be passed to control unit 226 for processing. Control unit 226 may insert the VRF configuration flow control message based on flow association 316 into the flow table 222 so that edge switch 220 becomes aware of the VRF information associated with HR-related packets.

Control unit 256 of edge switch 250 may then encapsulate the HR-related packet 420 with a VRF header corresponding to VRF-#3 to form an encapsulated HR-related packet 422. Control unit 256 may then create a VRF tunnel for forwarding encapsulated HR-related packet 422 from edge switch 250 to edge switch 220. In some examples, the VRF tunnel may meet the HR-related requirement that only the related edge switches 220 and 250 may decapsulate the HR-related packet 420 encapsulated in packet 422. Other switches and/or devices in sub-network 240 may be used to forward the encapsulated HR-related packet 422 as a regular IP packet based on the information such as source IP address and destination IP address of the packet, without having access to or being aware of the VRF information associated with HR-related packet 420. In some examples, the HR-related packet 422 may also be encrypted.

Control unit 256 may then transmit the encapsulated HR-related packet 422 towards edge switch 220 via sub-network 240. In some embodiments, the encapsulated HR-related packet 422 may be transmitted by one or more network slices of the sub-network 240 as a regular IP packet using the information such as source IP address and destination IP address.

When edge switch 220 receives the encapsulated HR-related packet 422, it may be passed to control unit 226 for processing. In some embodiments, because the edge switch 220 has been provisioned with the VRF configuration flow control message based on flow association 316, and also because the edge witch 220 has been informed by the VRF tunnel created by edge switch 250, control unit 226 of edge switch 220 may recognize the context of HR-related packet 422. In some examples, control unit 226 may decapsulate the VRF related header to return the encapsulated HR-related packet 422 back to the original HR-related packet 420. In some examples, control unit 226 may also decrypt the HR-related packet 422 when it has been encrypted by edge switch 250. In some embodiments, control unit 226 may further forward the HR-related packet 420 to end device 238 for handling.

As discussed above and further emphasized here, FIGS. 2, 3A-3E, and 4 are merely examples, which should not unduly limit the scope of the application. One of ordinary skill in the art would recognize many variations, alternatives, and modifications. In some embodiments, network 200 may include any number of switches, devices and/or applications, transmitting and receiving traffic with any suitable type of context. In some embodiments, fewer or more VRF tables and VRF configuration flow control messages than what are shown in FIGS. 3A-3E may exist as well.

Figure 5:
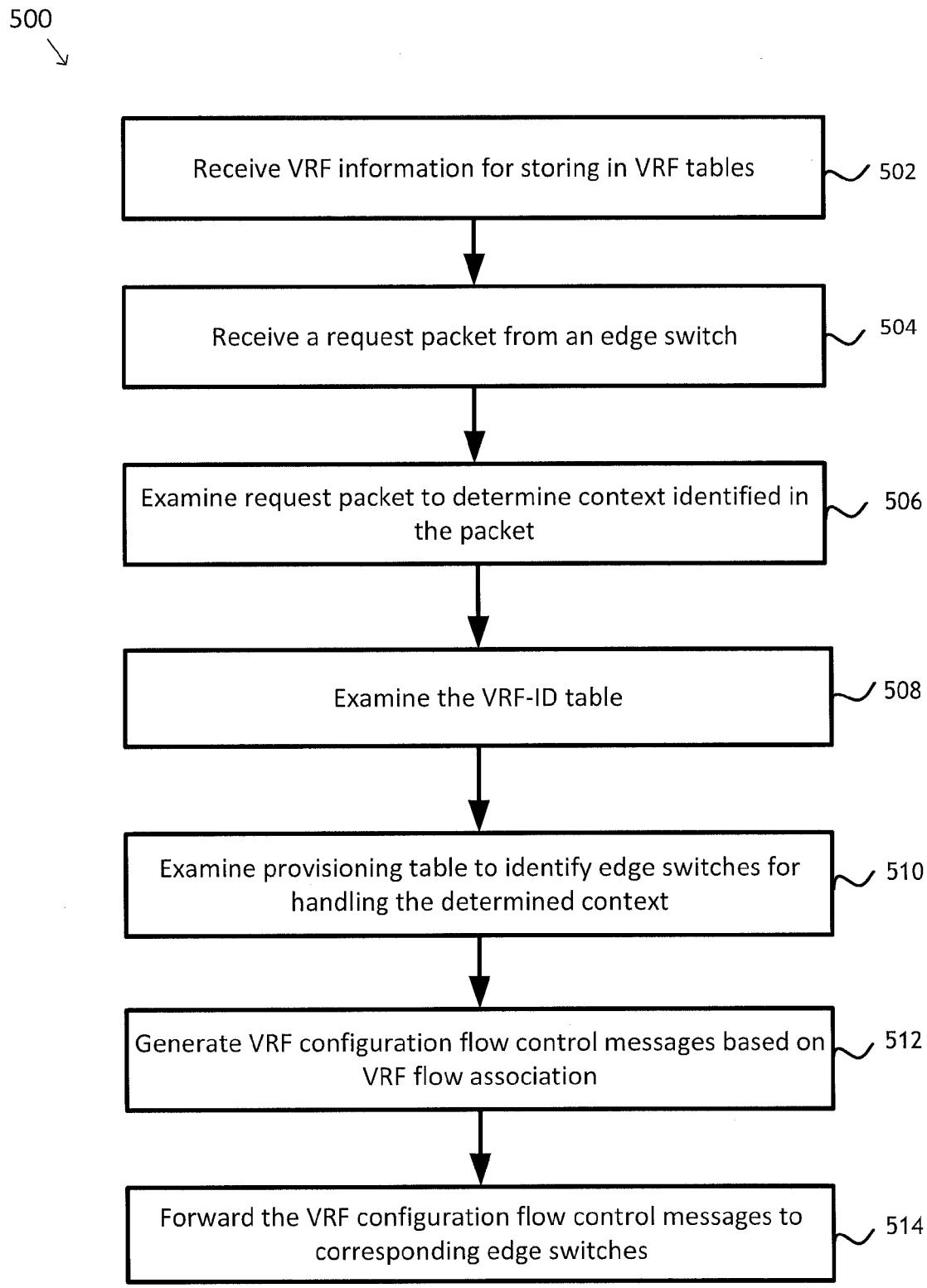
FIG. 5 is a flowchart showing a method of managing a context aware network using a SDN managing server according to some embodiments.

FIG. 5 is a flowchart showing a method 500 of managing a context aware network according to some embodiments. In some embodiments, one or more of the processes 502-514 of method 500 may be implemented, at least in part, in the form of executable code stored on non-transient, tangible, machine readable media that when run by one or more processors (e.g., the one or more processors of SDN managing server 210) may cause the one or more processors to perform one or more of the processes 502-514. In some embodiments, method 500 may be performed in a SDN managing server, such as SDN managing server 210.

At a process 502, VRF information may be received for storing in one or more VRF tables of the SDN managing server, e.g., VRF-ID table 212 and provisioning table 214. In some embodiments, the VRF information may be received from an administrator. In some embodiments, the VRF information may be received from other systems. In some embodiments, the VRF information may also include one or more VRF configuration flow associations, e.g., flow associations 312-316, 322-324, and/or 332-334, to be provisioned by SDN managing server 210 to one or more edge switches. The control unit of the SDN managing server may store the received VRF information in the one or more VRF tables. VRF may be used to create one or more virtual networks using the physical sub-networks, so that different types of network traffic, each encapsulated using VRF headers including respective VRF-ID and/or Flow-ID, may be handled using different data flow paths. The one or more VRF tables may be used by SDN managing server 210 and/or control unit 216 to store VRF associated flow information regarding the configuration of the edge switches, end devices, and/or applications in network 200. The one or more VRF tables may also include provisioning information to be dynamically propagated from SDN managing server 210 into the edge switches to create or update the multiple versions of the forwarding tables in the edge switches to support VRF.

At a process 504, a request packet, e.g., request packet 411 or request packet 421, may be received at a SDN managing server, e.g., SDN managing server 210. The request packet may be sent from an edge switch, e.g., edge switch 220, 250, and/or 270, to the SDN managing server to request VRF configuration information for a recently detected flow. The request packet includes at least the context related information of the recently detected flow so that the SDN managing server may examine the request packet, identify the context of the flow, and provide the VRF configuration information corresponding to the context. For example, request packet 411 includes at least the PCI-related context of PCI-related packet 410 generated by PCI-related application/end device, e.g., application 232 of end device 230, and request packet 421 includes at least HR-related context of the HR-related packet 420 generated by end device 268 of edge switch 250. In some embodiments, request packet may also include other information, such as layer 2 and/or layer 3 headers of the VRF packet.

At a process 506, the request packet is examined to determine the context identified in the packet. A control unit of the SDN managing server, e.g., control unit 216, may receive and examine the request packet. The control unit 216 may examine the context included in the request packet using deep packet inspection. During deep packet inspection, headers and/or data in one or more of the layers 4-7 may be inspected to determine the context included in the request packet.

At a process 508, the control unit of the SDN managing server, e.g., control unit 216 of SDN managing server 210, may then examine one or more VRF tables, e.g., VRF-ID table 212. The VRF-ID table may be examined to determine whether SDN managing server 210 has provisioning information for a VRF slice associated with the context of the PCI-related packet 410. The packet context information may be compared with the VRF tables. In some examples, when control unit 216 recognizes that its VRF-ID table includes the VRF information for the context determined during process 506, control unit 216 may further associate a corresponding VRF-ID with the determined context.

At a process 510, the control unit of the SDN managing server may then examine a provisioning table, e.g., provisioning table 214, to identify edge switches for handling the packet with the determined context. The identified edge switches may then be provisioned with the VRF flow information so that they may handle packets of the determined context.

At a process 512, a VRF configuration flow control message is generated based on a flow association. After examining the provisioning table and identifying the edge switches to be provisioned, the control unit of the SDN managing server may further check the VRF configuration flow associations to identify the flow association corresponding to the edge switch to be provisioned respectively. Flow associations indicate network traffic associated with a certain context to be handled by a certain application and/or an end device is associated with a Flow-ID and a VRF-ID. The VRF configuration flow control messages may then be formed to include the flow association information, such as flow associations 312-316, 322-324, and 332-334, corresponding to each of the edge switches to be provisioned respectively. The created VRF configuration flow control messages may then be forwarded to the corresponding edge switches. For example, flow association 312 indicates that network traffic associated with PCI-related context to be handled by application 232 of end device 230 is associated with Flow-1 and VRF-#1. A VRF configuration flow control message may be generated based on flow association 312 to be forwarded and provisioned to edge switch 220.

At a process 514, the generated VRF configuration flow control message may be forwarded from the SDN managing server to the related edge switches identified during process 510. For example, the VRF configuration flow control message based on flow association 312 may be forwarded to edge switch 220, and the VRF configuration flow control message based on flow association 332 may be forwarded to edge switch 270. The VRF configuration flow control messages may be forwarded using one of the network slices of the subnetwork, e.g., a management slice.

Figure 6:
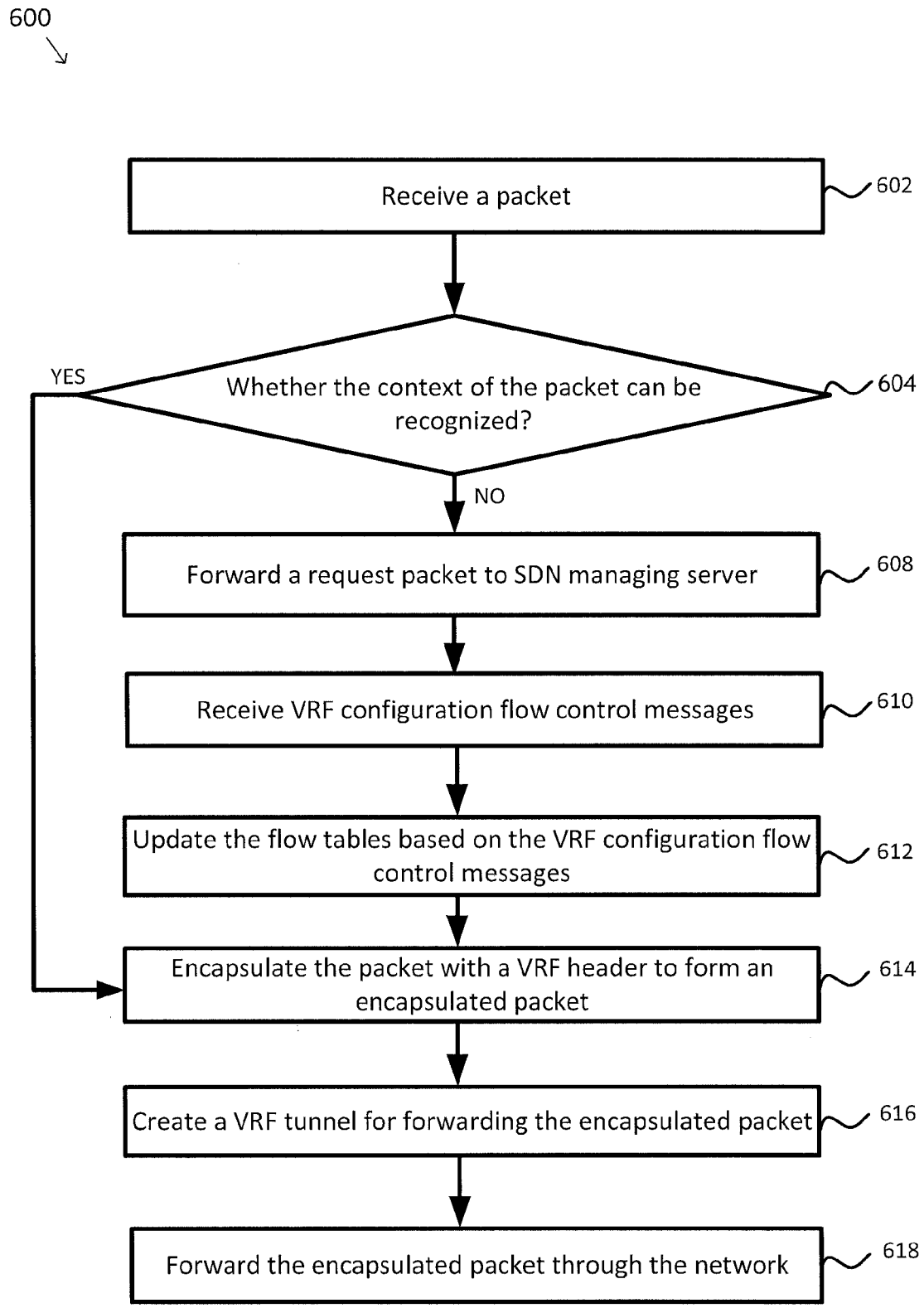
FIGS. 6-7 are flowcharts showing methods of handling a context aware network using edge switches according to some embodiments.

FIG. 6 is a flowchart showing a method 600 of handling a context aware network using an edge switch according to some embodiments. In some embodiments, one or more of the processes 602-618 of method 600 may be implemented, at least in part, in the form of executable code stored on non-transient, tangible, machine readable media that when run by one or more processors (e.g., the one or more processors of edge switch 220, 250, and/or 270) may cause the one or more processors to perform one or more of the processes 602-618. In some embodiments, method 600 may be performed in an edge switch, such as edge switch 220, 250, and/or 270.

At a process 602, a packet with a corresponding context, e.g., PCI-related packet 410, may be received at an edge switch, e.g., edge switch 220. Edge switch 220 may pass the PCI-related packet 410 to a control unit of the edge switch, e.g., control unit 226, for processing. The packet may be generated by a corresponding application of an end device coupled to the edge switch. For example, PCI-related packet 410 may be generated by application 232 of end device 230 to be received by application 282 of end device 280. The packet may include various network headers such as TCP and IP headers including a source IP address, a destination IP address, a protocol ID, a source port, a destination port, and/or the like. The corresponding context of the packet may be determined from the headers including related contents stored in the payloads.

At a process 604, it is determined whether the edge switch has provisioning information associated with a flow having the corresponding context to handle the packet. The control unit of the edge switch may compare the corresponding context information of the packet with the information stored in one or more tables of the edge switch. When there is provisioning information for handling network traffic associated with the corresponding context of the packet, method 600 may proceed to a process 614 for encapsulating the packet with a VRF header associated with the context. In some examples, the VRF header may include a VRF-ID corresponding to the context of the packet.

When there is no provisioning information for handling network traffic associated with the corresponding context, method 600 may proceed to a process 608 by forwarding a request packet, including at least the corresponding context of the VRF packet, to a SDN managing server of the network for handling. At the process 608, the request packet may be forwarded by the control unit of the edge switch to the SDN managing server. The request packet may be forwarded by the control unit of the edge switch to the SDN managing server via a sub-network. The request packet may be transmitted via one of the network slices, such as a control and/or management network slice of the sub-network.

After the SDN managing server receives the request packet with the context, the SDN managing server may generate a VRF configuration flow control message based on flow association to be forwarded and provisioned to corresponding edge switch(es) for handling the packet with corresponding context. At a process 610, the VRF configuration flow control message based on flow association, e.g., flow association 312, may be received at the edge switch, e.g., edge switch 220. The VRF configuration flow control message may be forwarded to the control unit of the edge switch for processing.

At a process 612, the flow table of the edge switch may be updated based on the received VRF configuration flow control message. The control unit of the edge switch may insert the VRF configuration flow control message into the flow table of the edge switch, so that the edge switch may become aware of the VRF information associated with the packet. The VRF information associated with the packet may include VRF-ID, Flow-ID, and context.

At a process 614, the packet may be encapsulated with a VRF header including a VRF-ID associated with the context of the VRF packet to form an encapsulated packet. For example, control unit 226 of edge switch 220 may encapsulate the PCI-related packet 410 with a VRF header corresponding to VRF-#1 to form an encapsulated PCI-related packet 412.

At an optional process 616, a VRF tunnel may be created for forwarding the encapsulated packet. For example, control unit 226 of edge switch 220 may create a VRF tunnel for forwarding the encapsulated packet 412 to a destination edge switch, e.g., edge switch 270. The VRF tunnel may meet the PCI requirement that only the related edge switches 220 and 270 may decapsulate the PCI-related packet 410 encapsulated in packet 412.

At a process 618, the encapsulated packet is forwarded through the network. In some examples, when there is a VRF tunnel created at the process 616, the encapsulated packet may be forwarded via the VRF tunnel to the corresponding edge switch. In some embodiments when there is no VRF tunnel created, the switches and/or devices in the network other than the corresponding edge switches for handling the context of the packet may be used to forward the encapsulated packet as a regular IP packet based on the information such as the source IP address and the destination IP address of the packet, without having access to or being aware of the context of the VRF packet, for example, the PCI-related context of the PCI-related packet 410.

Figure 7:
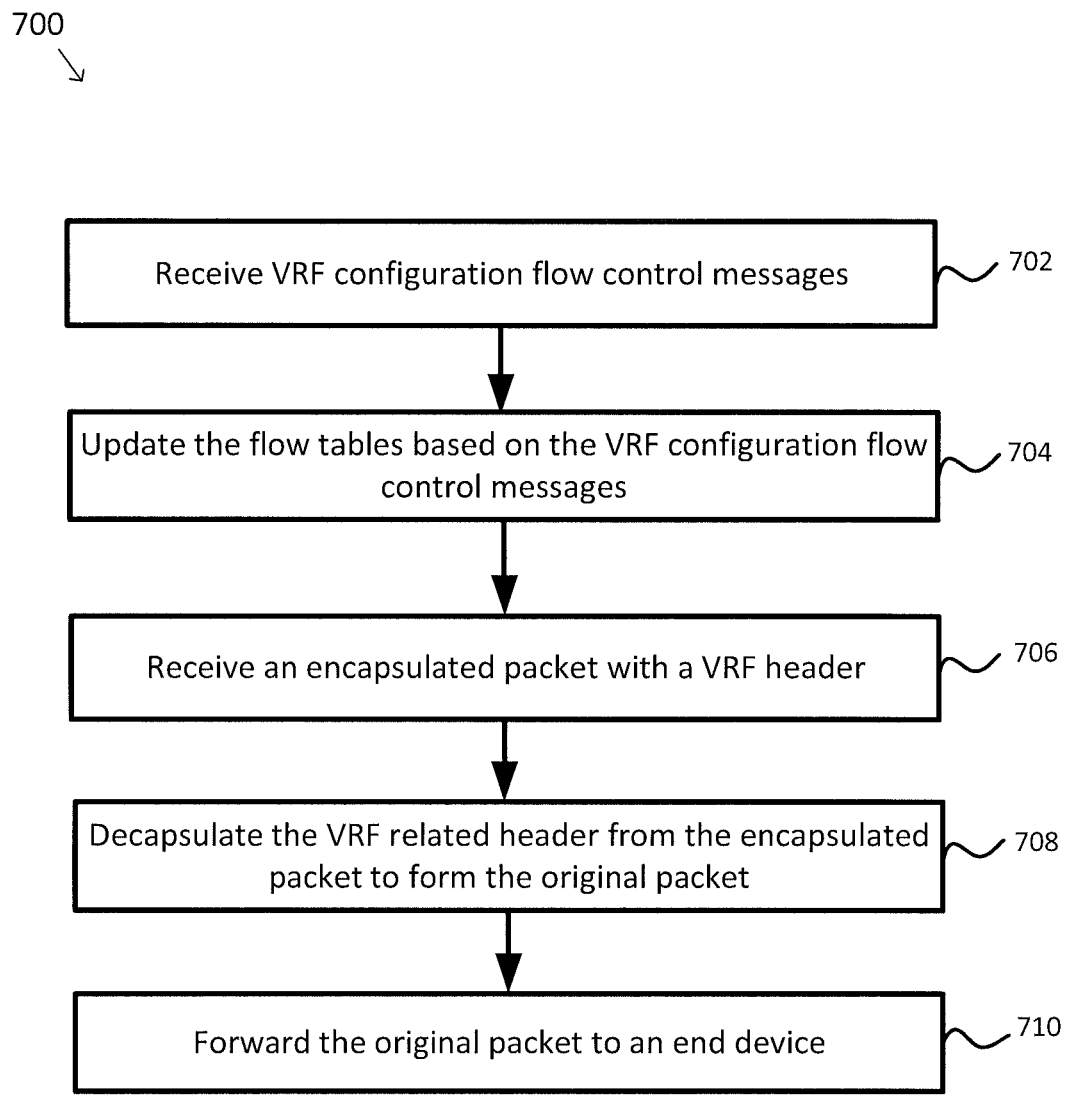

FIG. 7 is a flowchart showing a method 700 of handling a context aware network using an edge switch according to some embodiments. In some embodiments, one or more of the processes 702-710 of method 700 may be implemented, at least in part, in the form of executable code stored on non-transient, tangible, machine readable media that when run by one or more processors (e.g., the one or more processors of edge switch 220, 250, and/or 270) may cause the one or more processors to perform one or more of the processes 702-710. In some embodiments, method 700 may be performed in an edge switch, such as edge switch 220, 250, and/or 270.

At a process 702, a VRF configuration flow control message may be received. For example, a VRF configuration flow control message based on flow association 332 may be generated by SDN managing server 210 to be forwarded to edge switch 270 for handling the packet with corresponding context. The VRF configuration flow control message may be forwarded to the control unit of the edge switch for processing.

At a process 704, the flow table of the edge switch may be updated based on the received VRF configuration flow control message. The control unit of the edge switch may insert the VRF configuration flow control message into the flow table of the edge switch, so that the edge switch may become aware of the VRF information associated with the packet. The VRF information associated with the packet may include VRF-ID, Flow-ID, and context.

At a process 706, an encapsulated packet with a VRF header may be received. For example, encapsulated packet 412 with VRF header corresponding to VRF-#1 may be received at edge switch 270. In some examples, the encapsulated packet may be transmitted via a VRF tunnel created by a corresponding edge switch. In some examples, the encapsulated packet may be transmitted as a regular IP packet by one or more network slices of the sub-network. The encapsulated packet may be passed to the control unit of the edge switch for processing. The control unit may compare the context of the packet with the information stored in flow tables. In some examples, because the edge switch has been previously provisioned with the VRF configuration flow control message corresponding to the packet received during process 706, and/or has also been informed by a corresponding VRF tunnel the control unit may recognize the context of the received packet.

At a process 708, the edge switch may decapsulate the VRF related header from the encapsulated packet to form the payload packet. In some examples, control unit 276 may decapsulate the VRF related header to return the encapsulated PCI-related packet 412 back to the original PCI-related packet 410.

At a process 710, the original packet may be forwarded to end device for handling. In some embodiments based on the information stored in the flow tables of the edge switch, control unit 276 may forward the PCI-related packet 410 to end device 280 for handling. The end device 280 may use application 288 to handle the PCI-related packet 410.

Some embodiments of SDN managing server 210, switches 220, 250, and/or 270, may include non-transient, tangible, machine readable media that include executable code that when run by one or more processors may cause the one or more processors to perform the processes of method 500 and method 600 as described above. Some common forms of machine readable media that may include the processes of method 500 and method 600 are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

As discussed above and further emphasized here, the figure of the network controller is merely an example, which should not unduly limit the scope of the claims. One of ordinary skill in the art would recognize many variations, alternatives, and modifications. According to some embodiments, other architectures are possible for the network controller.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. An information handling system, comprising:
   a managing server comprising:
      a first processor;
      a first memory coupled to the first processor; and
      one or more virtual routing and forwarding (VRF) tables
        stored in the first memory; and a first edge switch comprising:
  a second processor;
  a second memory coupled to the second processor; and
  one or more flow tables stored in the second memory;
wherein the managing server is configured to:
  store VRF information in the one or more VRF tables;
  receive a request packet including a first context from the first edge switch;
  determine the first context included in the request packet;
  examine the one or more VRF tables to identify a first VRF-ID associated with the first context; and
  forward a VRF configuration flow control message to the first edge switch, the VRF configuration flow control message including one or more instructions for handling the first context;
wherein the first edge switch is configured to:
  receive a first packet associated with the first context;
  forward the request packet to the managing server;
  receive the VRF configuration flow control message from the managing server;
  update the one or more flow tables based on the VRF configuration flow control message;
  encapsulate the first packet with a VRF header including the first VRF-ID associated with the first context before forwarding the first packet; and
  forward the first packet based on the updated one or more flow tables.

2. The information handling system of claim 1, wherein the information handling system further comprises one or more second edge switches; and
  wherein the managing server is further configured to forward one or more additional VRF configuration flow control messages to the one or more second edge switches, each of the one or more additional VRF configuration flow control messages including one or more additional instructions for handling the first context.

3. The information handling system of claim 1, wherein the first edge switch is further configured to forward the first packet using a VRF tunnel.

4. The information handling system of claim 1, wherein the first edge switch is further configured to:
  receive a second VRF configuration flow control message from the managing server; and
  update the one or more flow tables based on the second VRF configuration flow control message;
  wherein the second VRF configuration flow control message includes a second VRF-ID associated with a second context different from the first context.

5. The information handling system of claim 4, wherein the first edge switch is further configured to handle a second packet associated with the second context based on the updated one or more flow tables.

6. The information handling system of claim 1, wherein the managing server is further configured to form the VRF configuration flow control message including the first VRF-ID.

7. The information handling system of claim 1, wherein examining the one or more VRF tables comprises identifying VRF-IDs of VRF flows and one or more second edge switches associated with the VRF-IDs.

8. The information handling system of claim 1, wherein the first edge switch is selected from a group consisting of a switch, a router, a bridge, and a hub.

9. A managing server comprising:
  a control unit;
  a memory coupled to the control unit;
  one or more virtual routing and forwarding (VRF) tables stored in the memory; and
  one or more ports coupled to the control unit and configured to couple the managing server to a network;
wherein the managing server is configured to:
  store VRF information in the one or more VRF tables;
  receive a request packet including a context from a first edge switch;
  determine the context included in the request packet;
  examine the one or more VRF tables to identify a VRF-ID associated with the context; and
  forward a VRF configuration flow control message to the first edge switch, the VRF configuration flow control message including instructions to the first edge switch to encapsulate packets from the context with a VRF header including the VRF-ID before forwarding the encapsulated packets.

10. The managing server of claim 9, wherein the one or more VRF tables comprise a VRF-ID table associating VRF-IDs with corresponding contexts of VRF flows.

11. The managing server of claim 9, wherein the context is associated with one or more selected from a group consisting of edge switches, end devices, and applications.

12. The managing server of claim 9, wherein the one or more VRF tables comprise a provisioning table associating VRF-IDs of VRF flows with one or more second edge switches.

13. The managing server of claim 9, wherein the VRF configuration flow control message includes the VRF-ID associated with the context.

14. The managing server of claim 9, wherein the managing server is further configured to forward one or more additional VRF configuration flow control messages to one or more second edge switches, each of the one or more additional VRF configuration flow control messages including one or more additional instructions for handling the context.

15. A method of managing networks, the method comprising:
  storing virtual routing and forwarding (VRF) information in one or more VRF tables;
  receiving a request packet including a context from a first edge switch;
  determining the context included in the request packet;
  examining the one or more VRF tables to identify a VRF-ID associated with the context; and
  forwarding a VRF configuration flow control message to the first edge switch, the VRF configuration flow control message including instructions to the first edge switch to encapsulate packets from the context with a VRF header including the VRF-ID before forwarding the encapsulated packets.

16. The method of claim 15, wherein determining the context comprises a deep packet inspection.

17. The method of claim 15, wherein examining the one or more VRF tables comprises identifying VRF-IDs and corresponding contexts of VRF flows associated with the VRF-IDs.

18. The method of claim 15, wherein examining the VRF tables comprises identifying VRF-IDs of VRF flows and one or more second edge switches associated with the VRF-IDs.

19. The method of claim 15, further comprising forming the VRF configuration flow control message to include the VRF-ID.

20. The method of claim 15, further comprising:
forming one or more additional VRF configuration flow control messages including one or more additional instructions for handling the context; and
forwarding the one or more additional VRF configuration flow control messages to one or more second edge switches.

21. An edge switch comprising:
a control unit;
a memory coupled to the control unit;
one or more flow tables stored in the memory; and
one or more ports coupled to the control unit and configured to couple the edge switch to a network;
wherein the edge switch is configured to:
receive a first packet including a first context;
forward a request packet including the first context to a managing server;
receive a first virtual routing and forwarding (VRF) configuration flow control message from the managing server;
update the one or more flow tables based on the first VRF configuration flow control message;
encapsulate the first packet with a VRF header including a first VRF-ID associated with the first context before forwarding the first packet; and
forward the first packet based on the updated one or more flow tables.

22. The edge switch of claim 21, wherein the first VRF configuration flow control message includes the first VRF-ID associated with the first context.

23. The edge switch of claim 21, wherein the edge switch is selected from a group consisting of a switch, a router, a bridge, and a hub.

24. The edge switch of claim 21, wherein the first packet is received from an end device, the end device being selected from a group consisting of a server, a work station, a PC, a laptop, a tablet, and a mobile device.

25. The edge switch of claim 21, wherein the edge switch is further configured to forward the first packet using a VRF tunnel.

26. The edge switch of claim 21, wherein the edge switch is further configured to:
receive a second VRF configuration flow control message from the managing server; and
update the one or more flow tables based on the second VRF configuration flow control message;
wherein the second VRF configuration flow control message includes a second VRF-ID associated with a second context different from the first context.

27. The edge switch of claim 26, wherein the edge switch is further configured to handle a second packet associated with the second context based on the updated one or more flow tables.

28. A method of handling network packets, the method comprising:
receiving a first packet including a first context at an edge switch;
forwarding a request packet including the first context to a managing server;
receiving a first virtual routing and forwarding (VRF) configuration flow control message from the managing server;
updating one or more flow tables based on the first VRF configuration flow control message;
encapsulating the first packet with a VRF header including a first VRF-ID associated with the first context before forwarding the first packet; and
forwarding the first packet based on the updated one or more flow tables.

29. The method of claim 28, further comprising determining whether the first context is included in the one or more flow tables.

30. The method of claim 28, wherein forwarding the first packet comprises forwarding the first packet using a VRF tunnel.

31. The method of claim 28, wherein receiving the first VRF configuration flow control message includes receiving the first VRF-ID associated with the first context.

32. The method of claim 28, further comprising:
receiving a second VRF configuration flow control message from the managing server; and
updating the one or more flow tables based on the second VRF configuration flow control message including a second VRF-ID associated with a second context different from the first context.

33. The method of claim 32, further comprising forwarding a second packet associated with the second context based on the updated one or more flow tables.

* * * * *